(12) United States Patent
Liu et al.

(10) Patent No.: US 8,381,964 B2
(45) Date of Patent: Feb. 26, 2013

(54) TIN-SILVER BONDING AND METHOD THEREOF

(75) Inventors: Cheng-Yi Liu, Zhongli (TW); Ming-Chung Kuo, Qieding Shiang (TW)

(73) Assignee: National Central University, Taoyuan County (TW)

( * ) Notice: Subject to any disclaimer, the term of this patent is extended or adjusted under 35 U.S.C. 154(b) by 0 days.

(21) Appl. No.: 13/447,973

(22) Filed: Apr. 16, 2012

(65) Prior Publication Data

US 2012/0199635 A1  Aug. 9, 2012

Related U.S. Application Data

(62) Division of application No. 12/430,429, filed on Apr. 27, 2009.

(30) Foreign Application Priority Data

Jan. 22, 2009  (TW) .............................. 98102526 A

(51) Int. Cl.
    *B23K 31/02*  (2006.01)
(52) U.S. Cl. ............... 228/180.21; 228/206; 228/254; 228/233.2
(58) Field of Classification Search ............... None
    See application file for complete search history.

(56) References Cited

U.S. PATENT DOCUMENTS

| | | | | |
|---|---|---|---|---|
| 3,314,771 A | * | 4/1967 | Wolfgang et al. | 428/635 |
| 4,187,599 A | * | 2/1980 | Flowers et al. | 438/126 |
| 4,331,253 A | * | 5/1982 | Gordon et al. | 220/200 |
| 4,756,467 A | * | 7/1988 | Schatzberg | 228/208 |
| 5,108,026 A | * | 4/1992 | Su et al. | 228/122.1 |
| 5,427,303 A | * | 6/1995 | Nowotarski | 228/180.22 |
| 5,452,842 A | * | 9/1995 | Melton et al. | 228/180.22 |
| 5,516,031 A | * | 5/1996 | Nishikawa et al. | 228/205 |
| 5,611,481 A | * | 3/1997 | Akamatsu et al. | 228/180.22 |
| 5,684,329 A | * | 11/1997 | Serizawa | 257/677 |
| 5,767,577 A | * | 6/1998 | Nihei et al. | 257/707 |
| 6,015,082 A | * | 1/2000 | Kivilahti | 228/180.22 |
| 6,082,610 A | * | 7/2000 | Shangguan et al. | 228/180.22 |
| 6,241,145 B1 | * | 6/2001 | Maeda et al. | 228/180.22 |
| 6,471,115 B1 | * | 10/2002 | Ijuin et al. | 228/180.22 |
| 6,651,321 B2 | * | 11/2003 | Beroz et al. | 29/840 |
| 6,764,938 B2 | * | 7/2004 | Akamatsu et al. | 438/613 |
| 6,805,974 B2 | * | 10/2004 | Choi et al. | 428/646 |
| 7,380,698 B2 | * | 6/2008 | Meyer et al. | 228/194 |
| 7,938,308 B1 | * | 5/2011 | Kim et al. | 228/4.5 |
| 2001/0013535 A1 | * | 8/2001 | Miyake et al. | 228/180.1 |
| 2004/0084509 A1 | * | 5/2004 | Meyer et al. | 228/194 |
| 2004/0201029 A1 | * | 10/2004 | Yamane et al. | 257/99 |

(Continued)

FOREIGN PATENT DOCUMENTS

JP  2007-281105 A  * 10/2007

OTHER PUBLICATIONS

Derwent-Acc-No. 1983-743578 which corresponds to JP-58-118101 (1983).*

*Primary Examiner* — Kiley Stoner
(74) *Attorney, Agent, or Firm* — Ming Chow; Sinorica, LLC

(57) ABSTRACT

A Sn—Ag bonding and a method thereof are revealed. By means of a bonding layer formed by tin and silver between wafers, the stress released by diffusion and bonding between tin(Sn) and silver(Ag) is larger than the stress released by diffusion and bonding of conventional gold-silver bonding. Moreover, a Sn—Ag bonding method of the present invention forms Sn—Ag bonding at low temperature and releases more stress so as to reduce thermal stress generated during wafer bonding effectively. And after wafer bonding, the high temperature processes can be performed.

13 Claims, 9 Drawing Sheets

U.S. PATENT DOCUMENTS

| | | | |
|---|---|---|---|
| 2005/0145997 A1* | 7/2005 | Buresch | 257/666 |
| 2005/0269385 A1* | 12/2005 | Chen et al. | 228/180.22 |
| 2006/0016694 A1* | 1/2006 | Tanaka et al. | 205/300 |
| 2006/0151871 A1* | 7/2006 | Mehrotra | 257/705 |
| 2008/0023906 A1* | 1/2008 | Kaiping | 271/145 |

* cited by examiner

| Temperature | stress released(MPa) | |
| --- | --- | --- |
| | Au/Ag boning | Sn/Ag boning |
| 150 °C | 30.6 | 125.8 |

FIG.9

TIN-SILVER BONDING AND METHOD THEREOF

The current application is a divisional application of, and claims a priority to U.S. Ser. No. 12/430,429 filed on Apr. 27, 2009.

The current application also claims a foreign priority to the application of Taiwan 098102526 filed on Jan. 22, 2009.

BACKGROUND OF THE INVENTION

1. Field of the Invention

The present invention relates to a bonding structure and a method thereof, especially to a Sn—Ag bonding and a method thereof.

2. Description of Related Art

Along with fast development of technologies, there is a trend in electronic components to be more light, thin and compact. A conventional single material is unable to meet these requirements of component design. Generally, each material has it own properties such as mobility of electron/hole, light absorbance, reflection rate, heat Conductivity, electrical resistance, and mechanical properties etc. However, in practice, there is no single material with optimum effects on various physical properties. Thus in order to achieve best photoelectric/electronic effect of photoelectric/electronic components, the properties of different materials must be integrated.

In early days, various materials are integrated by heteroepitaxial technique or ion implant technique used in manufacturing processes of integrated circuit (IC). The biggest problem encountered by heteroepitaxial technique is lattice match. Once the requirement of lattice match is not satisfied, the high quality epitaxial film can't be obtained and functions of the components are further affected. Moreover, the thickness of the epitaxial film produced by heteroepitaxial technique is no more than 10 μm. Such way is neither efficient nor cost-effective.

Furthermore, once ion implant is used to integrate various materials, a transition layer with high defect density is formed and the functions of components are affected.

Recently, an area of research that integrates various materials has become mature. The technique is wafer bonding technique that allows the integration of materials with lattice mismatch by means of wafer bonding and removal processes. The main purpose of wafer bonding is in building composite materials by bonding different materials and the composite materials with various properties are applied to different fields broadly. There are different types of wafer bonding as listed below (1) direct wafer bonding (2) anodic wafer bonding (3) low temperature wafer bonding (4) intermediate layer wafer bonding (5) adhesive wafer bonding . . . etc. The most common way is direct wafer bonding and adhesive wafer bonding. The direct wafer bonding is a method to join two same or dissimilar materials together while the adhesive wafer bonding is a bonding approach having an intermediate layer for bonding between two wafers.

Direct Wafer Bonding has been widely developed and has become very attractive for a lot of applications. It is also called Van der Waals bonding. Chemical bonds (electric dipole) are formed between two mirror wafers or epitaxial layers with very flat surfaces by chemical solutions. The wafers are initially quick bonded via weak Van der Waals bonding force. Then wafer pairs are applied with pressure and are heated. The wafer cleaning, the pressure applied, the heated temperature and time, and other parameters are determined according to the bonding material. Before heating, the direct bonding relies on weak Van der Waals force. The bonding energy obtained after heat processing is from diffusion of atoms at the interface.

In addition, the adhesive wafer bonding includes an intermediate bonding medium such as metal, wax, epoxy, and SOG (spin-on-glass). Thus annealing temperature and time of wafer bonding are reduced and the produced components are with better properties.

Now wafer bonding technique is broadly applied to photoelectric/electronic industries such as the improvement of performance of photoelectric components, manufacturing and applications of SOI (Silicon-on-insulator) chips, manufacturing and integrations of Si Discrete Power Devices as well as MEMS (Micro Electro Mechanical Systems) devices, and Optoelectronic Integrated Circuits (OEIC) manufactured by integration of photoelectric components and Ultra-Large Scale Integration (ULSI) chips. The above description explains how the wafer bonding technique is applied to optoelectronic components.

In order to use energy efficiently, develop high technology and protect the earth, the high brightness white light LED has become main point of development in solid state lighting in developed countries. It is estimated the light efficiency of high brightness white light LED will achieve 200 lm/W within 15 years so that it will replace all lighting devices in our daily lives at that time. Thus the electricity consumed by lighting equipments is reduced 50% and the overall electricity is saved up to 10%. Moreover, about two hundred million tons of carbon dioxide emitted is reduced. Thus not only energy is saved but also environmental protection is achieved.

The development of GaN based LED dramatically increases possibility of mass production of white light LED and plays a key role on that. Up to present, sapphire has played an important role in the improvement of internal quantum efficiency of GaN LED along with fast development of epitaxial technique and it also has great effect on the external quantum efficiency. In order to make a breakthrough, begin with packaging.

Due to low heat conductivity-40 W/moK, the poor heat dissipation capacity of sapphire severely affects internal quantum efficiency of GaN LED. In recent years, researchers have tried to grow GaN on silicon substrate whose heat dissipation capacity and conductivity are better than those of sapphire.

Besides, the wafer bonding technique can be used. The GaN LED is bonded with substrates having better thermal conductivity by metal bonding. The common bonding structure includes Au—Si bonding, Au—Sn bonding and Au—Ag bonding. The bonding temperature of the Au—Si bonding as well as the Au—Sn bonding is 363 and 282 degrees respectively while bonding temperature of the Au—Ag bonding is low temperature-150 degrees. The present invention provides a Sn—Ag bonding bonded at low temperature and a method thereof that further improves component performance as compared with Au—Ag bonding.

SUMMARY OF THE INVENTION

Therefore it is a primary object of the present invention to provide a Sn—Ag bonding structure without problems of thermal stress caused by different coefficients of thermal expansion of wafers.

It is another object of the present invention to provide a Sn—Ag bonding structure that bonds wafers at low temperature, effectively reduce stress generated during wafer bonding, and favors high temperature processes that follow the wafer bonding.

In order to achieve above objects, a Sn—Ag bonding of the present invention consists of a first wafer, a first bonding layer, a second bonding layer, and a second wafer. The first bonding layer is disposed on the first wafer and material of the first bonding layer is tin or tin alloy. The second bonding layer is arranged on the second wafer and material of the second bonding layer is silver or silver alloy.

A Sn—Ag bonding method of the present invention includes a plurality of steps. A first wafer and a second wafer are provided. Then a first bonding layer is formed on the first wafer by evaporation and the first bonding layer is made of tin or tin alloy. Simultaneously evaporate a second bonding layer onto the second wafer and the second bonding layer is made of silver or silver alloy. Next clean surfaces of the first bonding layer and the second bonding layer. The first bonding layer on the first wafer is attached with the second bonding layer on the second wafer and send them into a vacuum furnace. At last, the vacuum furnace is heated up to a certain temperature so that bonding occurs between the first bonding layer and the second bonding layer.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 9 shows released stress of an embodiment according to the present invention.

DETAILED DESCRIPTION OF THE PREFERRED EMBODIMENT

Figure 1:
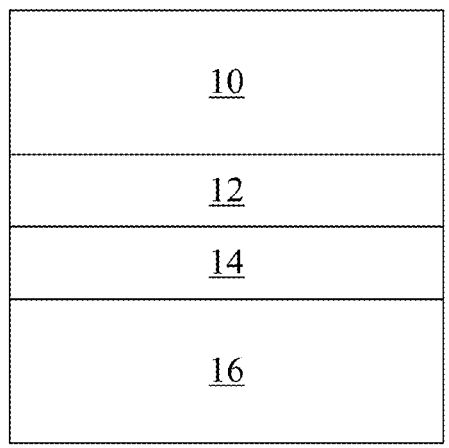
FIG. 1 is a schematic drawing showing structure of an embodiment according to the present invention.

Refer to FIG. 1, an embodiment of the present invention shows a Sn—Ag bonding structure. The Sn—Ag bonding 1 includes a first wafer 10, a first bonding layer 12, a second bonding layer 14 and a second wafer 16. The first bonding layer 12 is disposed on the first wafer 10 and the first bonding layer 12 is made of tin or tin alloy. The second bonding layer 14 is arranged on the second wafer 16 and the second bonding layer 14 is made of silver or silver alloy. The above first wafer 10 as well as the second wafer 16 is made of compounds, semiconductor or metal.

Figure 2:
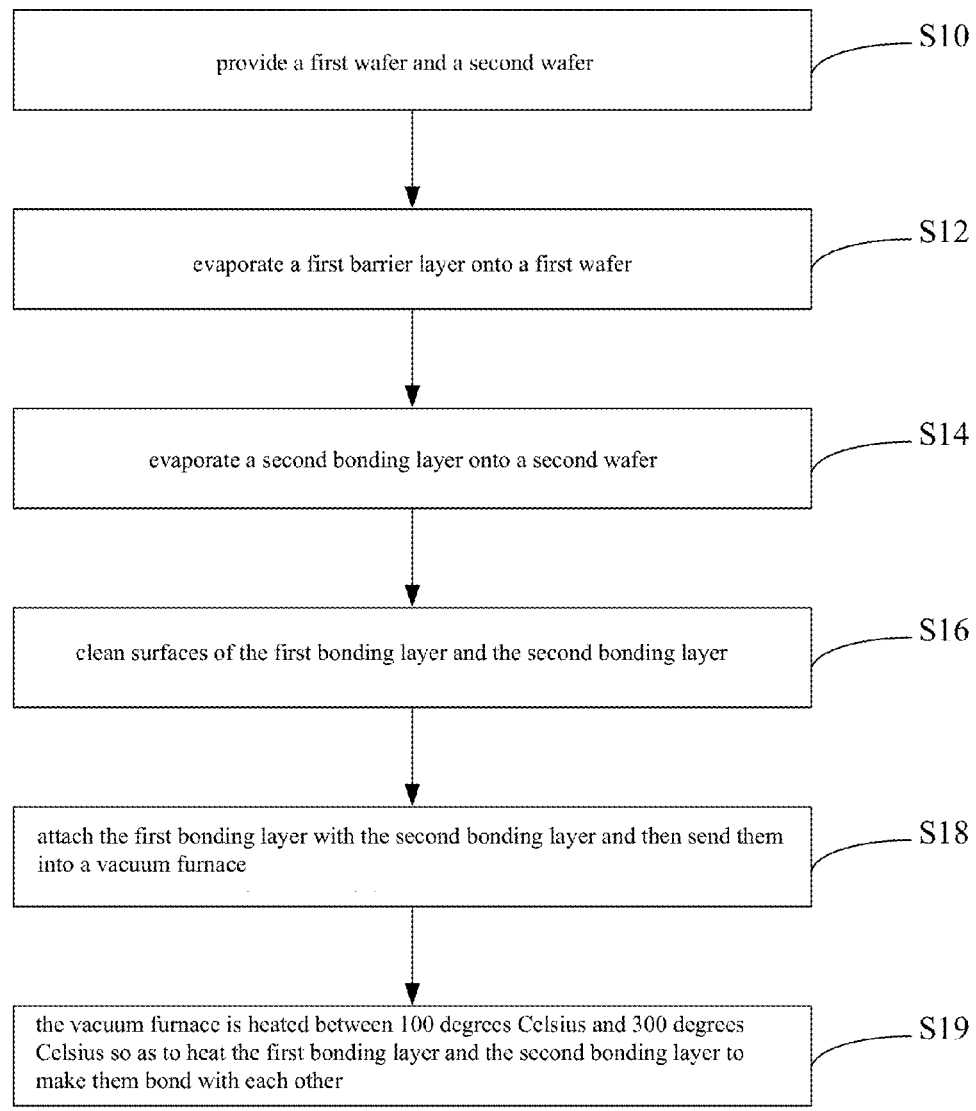
FIG. 2 is a flow chart of an embodiment according to the present invention.

Refer to FIG. 2, a flow chart of an embodiment according to the present invention is revealed. As shown in figure, a Sn—Ag bonding method of the present invention is a method to form a Sn—Ag bonding. Firstly, run the step S10. Provide a first wafer 10 and a second wafer 16. Then take the step S12, a first bonding layer 12 is formed on the first wafer 10 by evaporation. At the same time, run the step S14, evaporate a second bonding layer 14 onto a second wafer 16. In the step S12 and the step S14, the evaporation of the first bonding layer 12 on the first wafer 10 as well as the evaporation of the second bonding layer 14 onto the second wafer 16 is accomplished in several ways. In this embodiment, it's by electron beam evaporation while some other ways of evaporation can also be used.

After the first bonding layer 12 coated on the first wafer 10 and the second bonding layer 14 coated on the second wafer 16, take the step S16.

Figure 3:
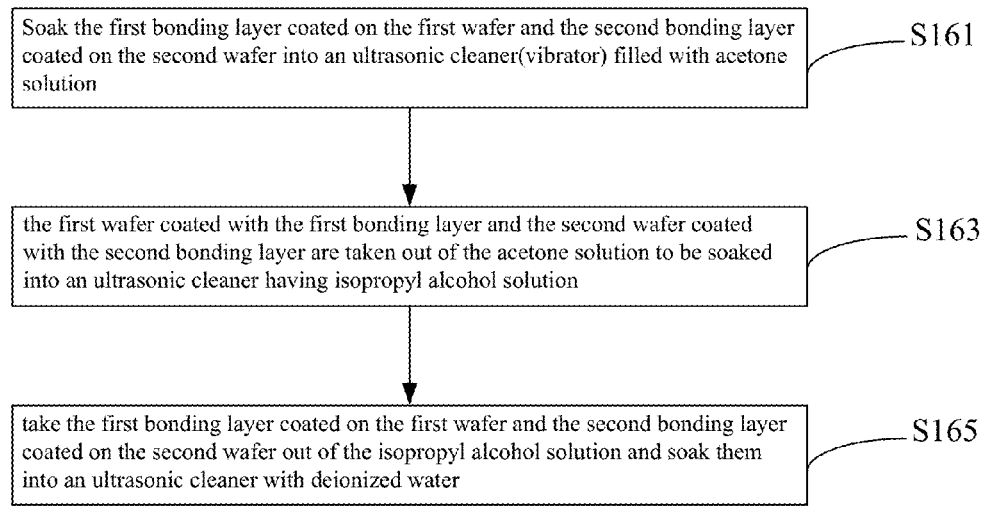
FIG. 3 is a flow chart of another embodiment according to the present invention.

Clean the first bonding layer 12 coated on the first wafer 10 as well as the second bonding layer 14 coated on the second wafer 16. There are various ways of cleaning such as gas cleaning, cleaning by chemical solutions or high energy particles. In this embodiment, an ultrasonic cleaner is used to clean surfaces of the first bonding layer 12 and the second bonding layer 14. The cleaning process further includes the following steps: with reference of FIG. 3, run the step S161 first. Soak the first bonding layer 12 coated on the first wafer 10 and the second bonding layer 14 coated on the second wafer 16 into an ultrasonic cleaner (vibrator) filled with acetone solution. The acetone solution removes contaminants from surfaces of the first bonding layer 12 as well as the second bonding layer 14. For example, the contaminants are oxides, dust or other materials attached on surfaces of the e first bonding layer 12 as well as the second bonding layer 14. Next run the step S163, after the contaminants being cleaned by acetone solution, the first wafer 10 coated with the first bonding layer 12 and the second wafer 16 coated with the second bonding layer 14 are taken out of the acetone solution to be soaked into an ultrasonic cleaner having isopropyl alcohol solution. The isopropyl alcohol solution dissolves residual acetone on surfaces of the first bonding layer 12 and the second bonding layer 14. At last, take the step S165, after removing residual acetone on surfaces of the first bonding layer 12 and the second bonding layer 14, take the first bonding layer 12 coated on the first wafer 10 and the second bonding layer 14 coated on the second wafer 16 out of the isopropyl alcohol solution and soak them into an ultrasonic cleaner with deionized water. The residual isopropyl alcohol solution on surfaces of the first bonding layer 12 and the second bonding layer 14 is dissolved in deionized water. After removing residual isopropyl alcohol solution on surfaces of the first bonding layer 12 and the second bonding layer 14, the cleaning of the surfaces of the first bonding layer 12 as well as the second bonding layer 14 is finished.

After finishing cleaning of the surfaces of the first bonding layer 12 as well as the second bonding layer 14, run the step S18, back to FIG. 2, the first bonding layer 12 coated on the first wafer 10 and second bonding layer 14 on the second wafer 16 are attached to each other and sent into a vacuum furnace. Then run the step S19, the vacuum furnace is heated between 100 degrees Celsius and 300 degrees Celsius so as to heat the first bonding layer 12 and the second bonding layer 14 to make them bond with each other. The degree of vacuum in the vacuum furnace keeps between from $10^{-2}$ torr to $10^{-6}$ torr. The bonding time of the first bonding layer 12 and the second bonding layer 14 ranges from 30 minutes to 4 hours. Besides bonding under vacuum conditions, hydrogen gas and nitrogen gas are further introduced while the ratio of hydrogen gas to nitrogen gas is 19:1.

Figure 4:
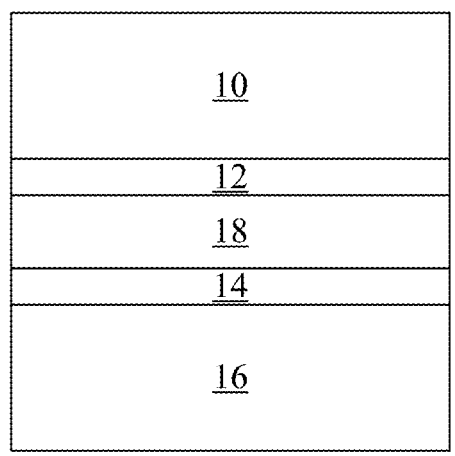
FIG. 4 is a schematic drawing showing structure of another embodiment according to the present invention.

Refer to FIG. 4, while the first bonding layer 12 and the second bonding layer 14 are bonding with each other, an interface layer 18 is generated between the first bonding layer 12 and the second bonding layer 14. The first bonding layer 12 is made of tin or tin alloy while the second bonding layer 14 is made of silver or silver alloy. Thus the interface layer 18 is formed by diffusion of material of the first bonding layer 12 toward material of the second bonding layer 14. The interface layer 18 is made of tin silver alloy.

Figure 5:
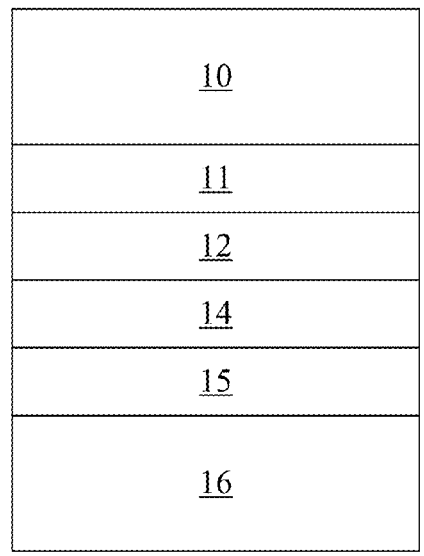
FIG. 5 is a schematic drawing showing structure of a further embodiment according to the present invention.

Refer to FIG. 5, another embodiment of the present invention is disclosed. As shown in figure, a Sn—Ag bonding 1 consists of a first wafer 10, a first barrier layer 11, a first bonding layer 12, a second bonding layer 14, a second barrier layer 15 and a second wafer 16. The first barrier layer 11 as well as the second barrier layer 15 is respectively arranged on the first wafer 10 and the second wafer 16 while the first bonding layer 12 and the second bonding layer 14 are disposed on the first barrier layer 11 and the second barrier layer 15 respectively. The material of the first bonding layer 12 is tin or tin alloy while the material of the second bonding layer 14 is silver or silver alloy. The first barrier layer 11 is to prevent diffusion of the two layers—the first bonding layer 12 and the first wafer 10. Similarly, the second barrier layer 15 is to prevent diffusion between the second bonding layer 14 and the second wafer 16. The material of the first barrier layer 11 as well as the second barrier layer 15 is selected from titanium (Ti)/nickel(Ni) or chromium(Cr)/platinum(Pt). The material of the first wafer 10 as well as the second wafer 16 is compound, semiconductor or metal.

Figure 6:
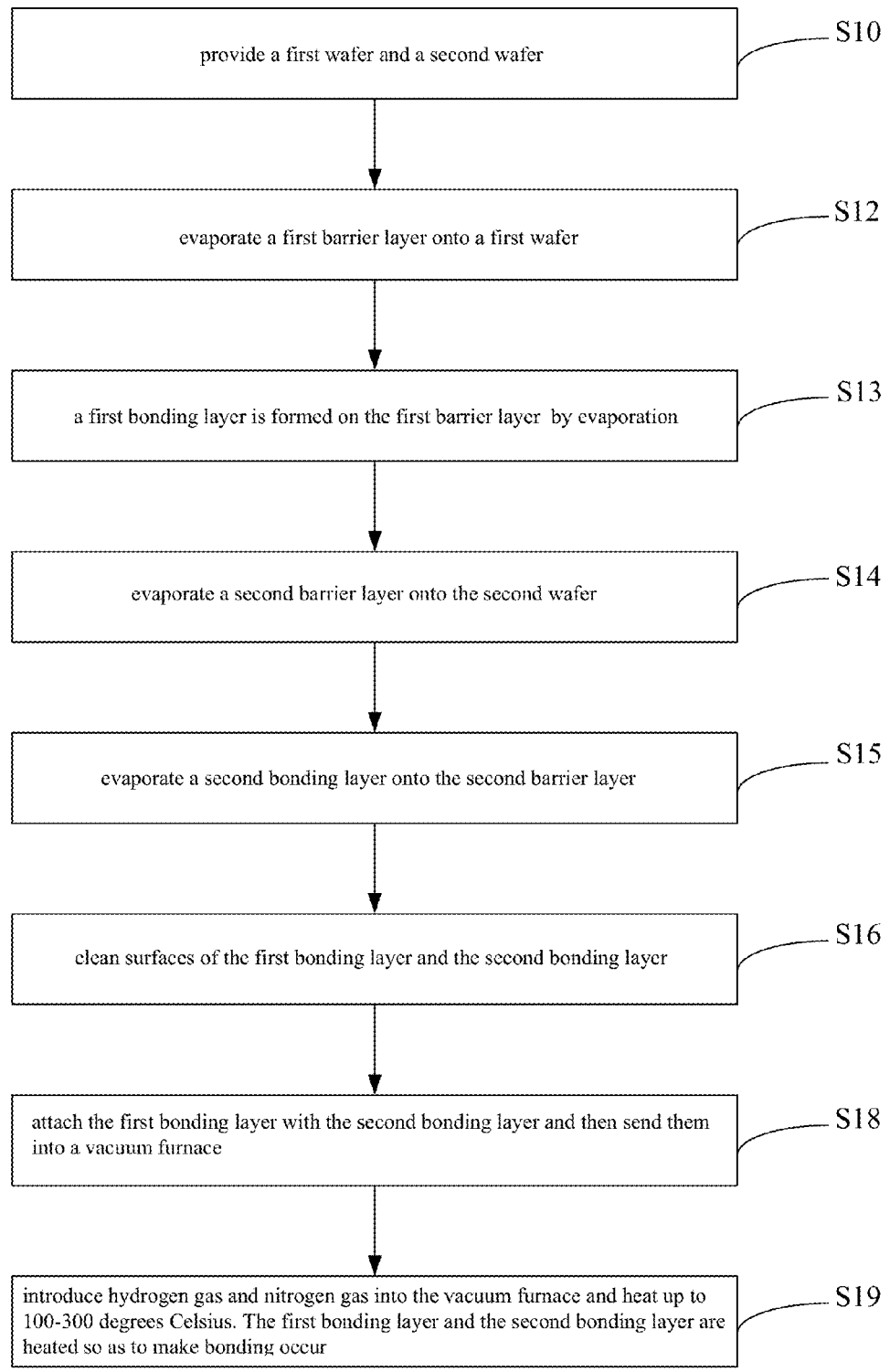
FIG. 6 is a flow chart of a further embodiment according to the present invention.

Refer to FIG. 6, a flow chart of a further embodiment is disclosed. A Sn—Ag bonding method to form a Sn—Ag bonding of the present invention includes the following steps: firstly, run the step S10, provide a first wafer 10 and a second wafer 16. Then take the step S12, evaporate a first barrier layer 11 onto a first wafer 10. Refer to step S13, a first bonding layer 12 is formed on the first barrier layer 11 by evaporation. At the same time, take the step S14, evaporate a second barrier layer 15 onto the second wafer 16. Next take the step S15, evaporate a second bonding layer 14 onto the second barrier layer 15. In the steps S12, S13, S14 and S15, the evaporation is accomplished in several ways. In this embodiment, it's by electron beam evaporation while some other ways of evaporation can also be used.

After finishing above steps, take the step S16, clean surfaces of the first bonding layer 12 and the second bonding layer 14. There are various ways of cleaning such as gas cleaning, cleaning by chemical solutions or high energy particles, the same with the embodiment in FIG. 2.

After finishing cleaning surfaces of the first bonding layer 12 and the second bonding layer 14, take the step S18. Attach the first bonding layer 12 with the second bonding layer 14 and then send them into a vacuum furnace. Refer to step S19, introduce hydrogen gas and nitrogen gas into the vacuum furnace and heat up to 100-300 degrees Celsius. The first bonding layer 12 and the second bonding layer 14 are heated so as to make bonding occur. The ratio of hydrogen gas to nitrogen gas is 19:1. And the bonding time of the first bonding layer 12 with the second bonding layer 14 ranges from 30 minutes to 4 hours.

It is learned from the above FIG. 4 that an interface layer 18 is generated between the first bonding layer 12 and the second bonding layer 14 while bonding occurring between the first bonding layer 12 and the second bonding layer 14.

Figure 7:
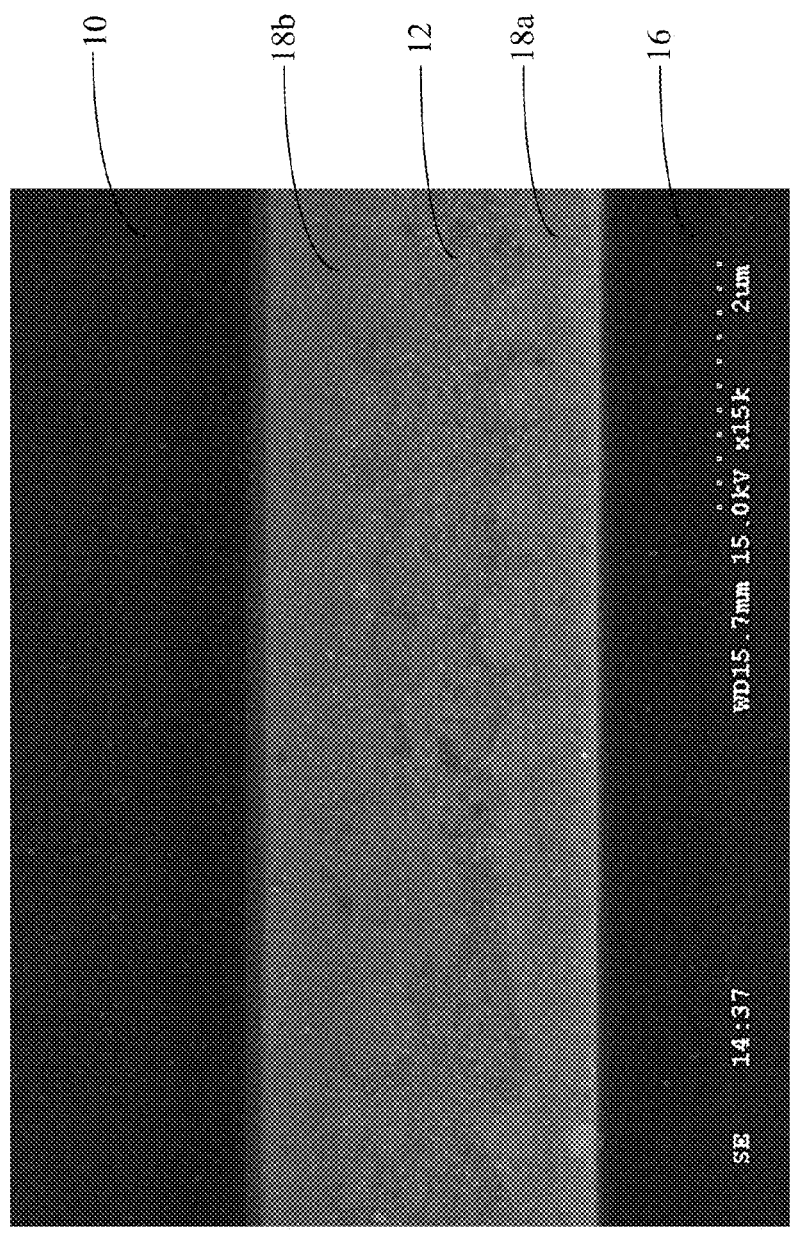
FIG. 7 is an electron microscopic image of an embodiment according to the present invention.

Refer to FIG. 7, an image of an embodiment from an electron microscope is revealed. The Sn—Ag bonding structure of the present invention mainly includes a first wafer 10, a copper layer, a tin layer, a silver layer and a second wafer 16. The copper layer is coated on the first wafer. The tin layer is deposit on the copper layer while the silver layer is coated on the second wafer. The copper layer and the tin layer are equal to the first bonding layer 12 of the above embodiment. The silver layer is equal to the second bonding layer 14 of the above embodiment. Bonding occurs between the tin layer and the silver layer so as to obtain Sn—Ag bonding structure. When the tin layer and the silver layer are bonded at 150 degrees Celsius, the Sn—Ag bonding structure is generated after 30 minutes (bonding time). Now the Sn—Ag bonding structure is observed by the electron microscope and a cross sectional view of the Sn—Ag bonding structure is obtained. It is found that a first interface layer 18a is generated between the tin layer and the silver layer and the first interface layer 18a is $Ag_3Sn$ while a second interface layer 18b is generated between the tin layer and the silver layer and the second interface layer 18b is $Cu_6Sn_5$.

Figure 8:
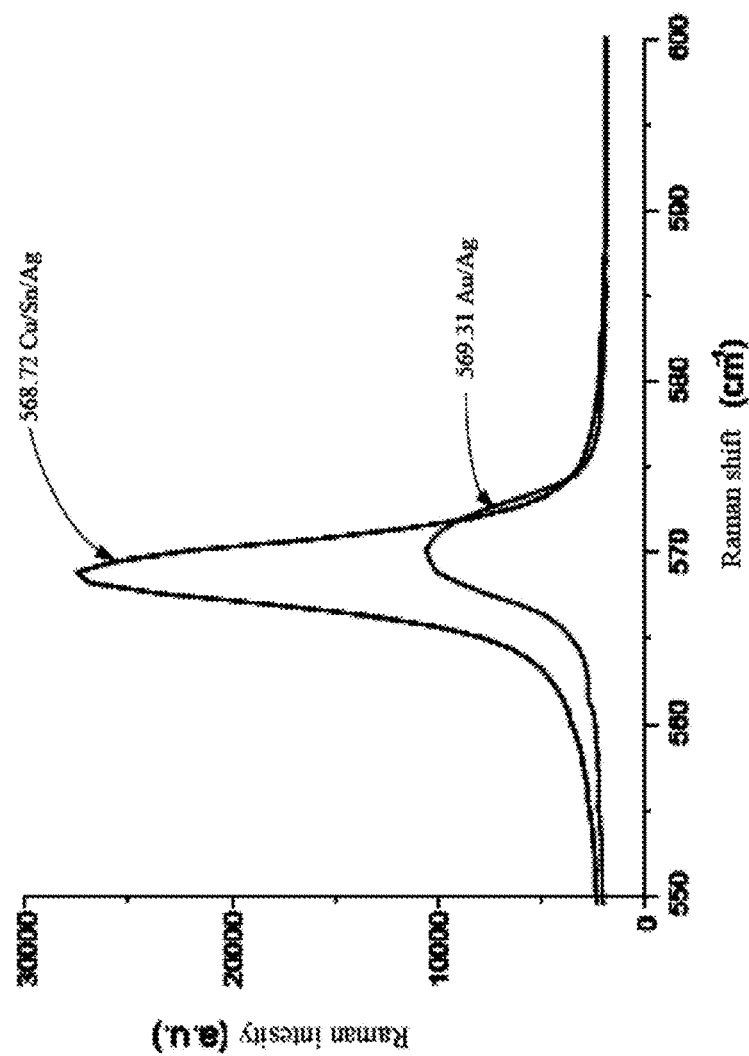
FIG. 8 is a Raman spectra of an embodiment according to the present invention.

Refer to FIG. 8 & FIG. 9, Raman spectra and stress released of an embodiment are revealed. As shown in figure, Raman shift of the Sn—Ag bonding structure in FIG. 6 is located on the left side of Raman shift of the Au—Ag bonding. This means the stress released by the Sn—Ag bonding is larger than that released by the Au—Ag bonding. Both the value of Raman shift of the Sn—Ag bonding and the value of Raman shift of the Au—Ag bonding are placed into Kozawa's equation so as to get a value of stress released by the Sn—Ag bonding and a value of stress released by the Au—Ag bonding. The result shows that the value of stress released by the Sn—Ag bonding is far more larger than the value of stress released by the Au—Ag bonding. Thus it is learned that a Sn—Ag bonding and a method thereof according to the present invention release stress generated during wafer bonding effectively. The thermal stress caused by large difference in coefficient of thermal expansion between wafers can be avoided and this favors high temperature processes after the wafer bonding.

In summary, the present invention provides a Sn/Ag bonding and a method thereof in which a wafer bonding is run at low temperature-100 degrees Celsius. By the bonding layer having tin and solver between wafers, more stress is released so as to reduce problems caused by thermal stress generated during wafer bonding effectively. And this also favors high temperature processes that follow the wafer bonding.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A Sn—Ag bonding method comprising the steps of:
    providing a first wafer and a second wafer, evaporating a first bonding layer onto the first wafer while the first bonding layer is made of tin or tin alloy,
    evaporating a second bonding layer onto the second wafer while the second bonding layer is made of silver or silver alloy,
    cleaning surfaces of the first bonding layer and the second bonding layer,
    attaching the first bonding layer on the first wafer with the second bonding layer on the second wafer and being sent to a vacuum furnace, and
    heating the vacuum furnace to a certain temperature and bonding occurring between the first bonding layer and the second bonding layer, wherein bonding time of the bonding occurring between the first bonding layer and the second bonding layer ranges from 30 minutes to 4 hours.

2. The method as claimed in claim 1, wherein before the step of heating the vacuum furnace to a certain temperature, the method further comprises a step of introducing hydrogen gas and nitrogen gas.

3. The method as claimed in claim 2, wherein the ratio of hydrogen gas to nitrogen gas is 19:1.

4. The method as claimed in claim 1, wherein the step of evaporating a first bonding layer onto the first wafer is run by electron beam evaporation.

5. The method as claimed in claim 1, wherein the step of evaporating a second bonding layer onto the second wafer is run by electron beam evaporation.

6. The method as claimed in claim 1, wherein the step of cleaning surfaces of the first bonding layer and the second bonding layer is run by ultrasonic cleaning.

7. The method as claimed in claim 1, wherein the step of cleaning surfaces of the first bonding layer and the second bonding layer comprising the steps of:
   soaking the first bonding layer and the second bonding layer into acetone solution for removing contaminants on surfaces of the first bonding layer and the second bonding layer;
   soaking the first bonding layer and the second bonding layer into isopropyl alcohol solution for removing residual acetone on surfaces of the first bonding layer and the second bonding layer;
   soaking the first bonding layer and the second bonding layer into deionized water for removing residual isopropyl alcohol on surfaces of the first bonding layer and the second bonding layer.

8. The method as claimed in claim 1, wherein bonding temperature of the bonding occurring between the first bonding layer and the second bonding layer ranges from 100 degrees Celsius to 300 degrees Celsius.

9. The method as claimed in claim 1, wherein degree of vacuum in the vacuum furnace ranges from $10^{-2}$ torr to $10^{-6}$ torr while bonding occurring between the first bonding layer and the second bonding layer.

10. The method as claimed in claim 1, wherein before the step of evaporating a first bonding layer onto the first wafer, the method further comprises a step of:
    evaporating a first barrier layer onto the first wafer.

11. The method as claimed in claim 10, wherein the first barrier layer is made of titanium(Ti)/nickel(Ni) or chromium (Cr)/platinum(Pt).

12. The method as claimed in claim 1, wherein before the step of evaporating a second bonding layer onto the second wafer, the method further comprises a step of:
    evaporating a second barrier layer onto the second wafer.

13. The method as claimed in claim 12, wherein the second barrier layer is made of titanium(Ti)/nickel(Ni) or chromium (Cr)/platinum(Pt).

\* \* \* \* \*